Patented Sept. 5, 1944

2,357,393

UNITED STATES PATENT OFFICE 2,357,393

PROCESS FOR THE PRODUCTION OF PHOTOGRAPHIC COLOR IMAGES

Alfred Fröhlich and Wilhelm Schneider, Dessau, Germany, assignors to General Aniline & Film Corporation, New York, N. Y., a corporation of Delaware No Drawing. Application May 14, 1940, Serial No. 335,144. In Germany May 22, 1939

20 Claims. (Cl. 95—6)

This invention relates to the production of photographic color images.

It is known to use for the production of photographic color images silver halide emulsions containing color formers fast to diffusion, which are added in soluble form to the photographic silver halide emulsion, but are not capable of being washed out therefrom. Such color formers fast to diffusion are obtained from simple dyestuff components by introducing certain substituents preventing diffusion. As substituents preventing such diffusion there were proposed amongst others carbon chains containing more than five carbon atoms. Groups effecting water-solubility like sulfo- or carboxyl groups were also introduced in order to render the color formers water-soluble and to facilitate in this way their incorporation into the emulsion and also to prevent crystallisation of the substances before and after the manufacturing process.

Also radicals of resins, bile acids, polypeptides, carbohydrates may be introduced into the molecule of the color former instead of these carbon chains as substituents preventing diffusion.

In U. S. Patent 2,280,722, it was proposed furthermore to introduce into the molecule of the color former substituents having several members, on which—besides the initial and end members—the same carbon arrangements appear several times and are connected by hetero atoms. In this case for instance a chain of ethylene oxide is connected to a molecule of the color former by polymerizing either ethylene oxide or its homologs directly onto a preliminary product of the color former or by connecting the color former to a suitable intermediate product which carries a chain substituent consisting for instance of polyethylene oxide.

In U. S. Patent 2,307,399, moreover, it was proposed to bind color formers directly onto nitrogenous polymerisates. Furthermore there was mentioned the condensation with acid chlorides capable of coupling of such polymerisates which contain amino groups and are obtained for instance by a reaction of polyvinyl chloride or polyvinyl bromide with ammonia. This reaction of polymeric chlorides with ammonia succeeds, however, under extreme reaction conditions only and leads to compounds which show extensive net-formation and carry quite a lot of nitrogen atoms without reactive hydrogen, i. e. tertiary amino groups. These tertiary amino groups naturally are no longer suitable for the reaction with acid halides and consequently the color formers obtained from these polymerisates—the latter containing amino groups—by a reaction with chlorides capable of coupling show a very slight degree of coloring only. When polyvinyl chloride is caused to react with ammonia, a portion of the polyvinyl chloride is also split up into low polymers which cannot be separated from the polymerisate. These portions of low molecular weight, however, react also with the acid chlorides capable of coupling and these reaction products are not fast to diffusion on account of their low molecular weight. The color formers thus obtained have besides the low degree of coloring and limited fastness to diffusion no homogeneous quality.

Furthermore it was proposed to obtain color formers fast to diffusion by a reaction of acid chlorides capable of coupling with such polymerisates containing primary amino groups which were produced by amidation of polyvinyl chloro acetate. In this case well defined amino compounds are obtained which react easily with acid chlorides capable of coupling, but the products thus prepared are so little soluble in alkali, that it is rather difficult to incorporate them into a photographic silver halide emulsion. On the other hand these color formers cannot stand a long treatment with alkali or heating up with diluted alkali, since otherwise there occurs—as is to be expected—a complete or partial saponification of the acetyl group, wherewith naturally the desired fastness to diffusion of the color former is again abolished. The same difficulties are encountered, if this color former is subjected to a sulfonation process with a view of bettering its alkali solubility.

It is an object of the present invention to provide photographic color images.

Another object is the production of such color images by means of color formers fast to diffusion.

These and other objects will become apparent from the following specification.

These disadvantages may be avoided, if color formers are used, which are obtained by condensation of acid chlorides capable of coupling with such polymerisates containing amino groups which are prepared by amidation of mixed polymerisates from halogen-free and halogen-substituted monomers or by amidation of the chloro acetals of polymers containing hydroxy groups or by amidation of polymeric vinyl ketones. The halogen in the mixed polymerisates is so easily exchangible for the amino group, that an essential unwanted formation of tertiary amino groups or further net-formation, which changes the original physical properties of the mixed polymerisates, does not occur. If the mixed polymerisates containing amino groups are condensed with an acid chloride capable of coupling, for instance α-hydroxy-naphthoic acid chloride, a color former of high coloring degree and completely fast to diffusion is obtained, which on account of the easily controllable amidation of halogen-substituted mixed polymerisates may be produced without difficulties always in equal quality.

If the halogen atoms of the acetals obtained by reacting polymerizates containing hydroxyl groups with aldehydes containing halogen are substituted by amino groups, the color former obtained therefrom may be treated with alkali for a long time without difficulties or it may be sulfonated, since the acetals, contrary to the acetates, are not split up under the given conditions.

Mixed polymerisates containing amino groups suitable to render color formers fast to diffusion are for instance the amidation products of the mixed polymerisates from vinyl chloride and maleic acid anhydride, from vinyl chloride and fumaric acid, from vinyl chloride and itaconic acid, from vinyl chloride and crotonic acid, from asymmetric ethylene dichlorides with maleic acid, fumaric acid, itaconic acid or crotonic acid.

The acetals obtained by reacting polymerizates containing hydroxyl groups with aldehydes containing halogen, as for instance the acetal of polyvinyl alcohol and chloropropionaldehyde, are suitable as acetals according to the present invention.

The amidation of polymerisates containing halogen with ammonia is known and leads preferably to the formation of primary amino groups. Better suited, however, to render color formers for photographic purposes fast to diffusion, are such polymerisates containing amino groups which are obtained by amidation with primary amines, as for instance monoalkyl amines, mono hydroxy alkyl amines or arylamines, so that preferably secondary amino groups are formed in the mixed polymerisate, since the color formers obtained therefrom possess better solubility and more favourable photographic properties. As color formers which may be condensed with such mixed polymerisates containing amino groups or with polymerisates also containing amino groups and being obtained from chloro acetals of polymeric compounds containing hydroxyl groups or by amidation of polyvinyl ketones, all color formers are suitable, which carry atoms or atom groups suitable for the reaction with primary or secondary amino groups, for instance carboxyl groups, sulfo groups or halogens. Such color formers are for instance naphtholsulfo acids, naphthol carboxylic acids, phenol carboxylic acids, cresotic acids with free p-position, xylenol carboxylic acids, in which the p-position is either free or occupied by a halogen atom, further 1-hydroxybenzene-2,6-dicarboxylic acid, hydroxycinnamic acid, 1-hydroxy-2-methyl-4-bromobenzene-6-carboxylic acid, hydroxycarbazole carboxylic acid, 2-hydroxy-diphenyl carboxylic acid, 2-hydroxydiphenyl-methane dicarboxylic acid, 5-hydroxytetrahydroquinoline-6-carboxylic acid, further compounds which carry an active methylene group and an acid group, as for instance phenyl-pyrazolone carboxylic acid, methylnaphthyl pyrazolone carboxylic acids, hydroxythionaphthene carboxylic acids, acetoacetyl anthranilic acids, benzoylacetyl amino benzoic acid esters and the like.

The introduction of these compounds into the polymerisate is accomplished especially by means of the activated acid groups, for instance by means of the acid chlorides or esters or with the aid of reactive halogen atoms or aldehyde groups. The reaction is carried out according to known methods, for instance by melting together the polymerisates with acid halides in the presence of an acid binding agent, for instance of a tertiary amine like pyridine or quinoline, if necessary in a nitrogen atmosphere, and, if the polymerisate shows too high a melting point, in the presence of a solvent, for instance nitrobenzene, acetophenone, butylacetate, phenylacetate or of the corresponding alcohols or high-boiling ethers like dibutylether.

The reaction may be controlled by the quantity of the color former added for the reaction to the polymerisate in such a way, that all or part of the reactive amino groups present in the polymerisate are occupied by the color forming molecule. Different properties like solubility or degree of coloring depend on the number of the occupied amino groups. By directing the reaction it is possible to produce the desired solubility or degree of coloring of the color formers.

The condensation products to be employed according to the present invention may be added in aqueous, if necessary alkaline solution to the photographic silver halide emulsion at any stage of the manufacturing process. If necessary, these compounds may be predissolved in the gelatin solution.

The silver halide emulsions thus produce, which may be subjected to a short washing process before casting, are worked up into photographic layers in a known manner. They may be arranged on one or both sides of the support, if necessary on top of one another and may be sensitized for different regions of the spectrum. But the silver halide emulsions may be worked up also in a different way. For instance differently sensitized emulsions may be arranged on a support with different color formers in the form of small particles.

The production of the color images may be accomplished in different ways, for instance according to U. S. Patents 2,179,228; 2,179,238; 2,178,612; 2,186,849; 2,186,730 and French Patent 814,731. The images may be formed in the exposed emulsion layers by simple color forming development or reversal development according to U. S. Patents 2,229,137 and 2,179,234. The color formers according to this invention, moreover, may be employed together with other color formers fast to diffusion within the different emulsion layers, according to U. S. Patents 2,179,238; 2,178,612; 2,179,244; 2,186,849; 2,186,850 and 2,186,732.

*Example I*

1 kg. silver halide emulsion is mixed with 15 grams of the condensate from 20 grams mixed polymerisate amidated with ammonia from polyvinyl chloride and maleic acid and 20 grams hydroxynaphthoic acid chloride in feebly alkaline solution. The preparation of this condensate is accomplished according to the usual laboratory methods from α-hydroxynaphthoic acid and the polymerisate containing amino groups. 20 grams of the polymerisate containing amino groups are dissolved in 80 cc. quinoline, thereto are slowly added 40 grams α-hydroxynaphthoic acid chloride at a temperature of 130° C. and the whole heated up for 15 minutes. The melt is stirred while still warm, into two liters of ether, the precipitate sucked off and washed with ether. A nearly white powder soluble in caustic soda solution is obtained. After exposure a layer consisting of an emulsion with this color former yields a blue dyestuff image, when developed with p-amino dimethyl aniline. If, however, the silver image is transformed into an antidiazotate silver in a known manner, according to the diazo component employed, a red to blue-violet dyestuff image is obtained.

*Example II*

15 grams of the condensation product according to Example I from 20 grams 1,2,3,4-xylenocarboxylic acid chloride and 40 grams of the amidated mixed polymerisate from polyvinyl chloride and itaconic acid are added to 1 kg. of silver halide emulsion. When worked up according to Example I, this emulsion yields a dyestuff image which in its shade closely resembles the one obtained in Example I.

*Example III*

15 grams of the condensate obtained according to Example I from 20 grams of 1-hydroxybenzene-2-6-dicarboxylic acid chloride and 40 grams of the reaction product from methylamine and the mixed polymerisate from vinyl chloride and fumaric acid are added to 1 kg. of silver halide emulsion. If the layers are worked up according to Example I, a dyestuff image is obtained which resembles that obtained in Example I.

*Example IV*

15 grams of the condensate obtained according to Example I from 40 grams polyvinyl methyl ketone amidated with ammonia and 10 grams 1-phenyl-3-methyl-5-pyrazolone-3'-carboxylic acid chloride are added to 1 kg. of silver halide emulsion. If worked up according to Example I, red or yellow dyestuff images are obtained.

*Example V*

15 grams of the condensate obtained according to Example I from 40 grams of acetoacetyl amino phenyl carboxylic acid and 40 grams of the chloropropion acetal from polyvinyl alcohol, treated with ammonia, are added to 1 kg. of silver halide emulsion. If worked up according to Example I, yellow dyestuff images are obtained.

We claim:

1. Silver halide emulsions containing as a color former fast to diffusion the condensation product of a compound capable of reacting with the oxidation products of a primary aromatic amino developer to produce a dyestuff image, with a polymer containing secondary amino groups obtained by the amidation of a polymer selected from the class consisting of mixed polymers derived from monomers containing and monomers free from halogen, halogenated polyvinyl acetals and keto-group containing vinyl polymerisates, said polymer containing amino groups being joined to said compound by a linkage selected from the class consisting of carbonamide, sulfonamide, azomethine and direct nuclear carbon to nitrogen linkages.

2. Silver halide emulsions containing as a color former fast to diffusion the condensation product of a compound capable of reacting with the oxidation products of a primary aromatic amino developer to produce a dyestuff image, with a polymer containing amino groups obtained by the amidation of a polymer derived from monomers containing and monomers free from halogen, said polymer containing amino groups being joined to said compound by a linkage selected from the class consisting of carbonamide, sulfonamide, azomethine and direct nuclear carbon to nitrogen linkages.

3. Silver halide emulsions containing as a color former fast to diffusion the condensation products of a compound capable of reacting with the oxidation products of a primary aromatic amino developer to produce a dyestuff image, with a polymer containing amino groups obtained by the amidation of a keto-group containing vinyl polymerisate, said polymer containing amino groups being joined to said compound by a linkage selected from the class consisting of carbonamide, sulfonamide, azomethine and direct nuclear carbon to nitrogen linkages.

4. Silver halide emulsions containing as a color former fast to diffusion the condensation product of a compound capable of reacting with the oxidation products of a primary aromatic amino developer to produce a dyestuff image with a polymer containing secondary amino groups obtained by the amidation of a halogenated polyvinyl acetal, said polymer containing amino groups being joined to said compound by a linkage selected from the class consisting of carbonamide, sulfonamide, azomethine and direct nuclear carbon to nitrogen linkages.

5. Silver halide emulsions as defined in claim 3 wherein said amino groups are secondary.

6. Silver halide emulsions as defined in claim 2 wherein said amino groups are secondary.

7. Silver halide emulsions containing as a color former fast to diffusion the condensation product of a compound capable of reacting with the oxidation products of a primary aromatic amino developer to produce a dyestuff image with the amidated mixture polymerisate from polyvinyl chloride and an unsaturated aliphatic dicarboxylic acid, said polymer being linked to said compound by an amide linkage.

8. Silver halide emulsions as defined in claim 7 wherein said unsaturated aliphatic dicarboxylic acid is maleic acid.

9. Silver halide emulsions containing as a color former fast to diffusion the condensation product of hydroxynaphthoic acid and the amidated mixed polymerisate from polyvinyl chloride and maleic acid, said polymer being linked to said hydroxynaphthoic acid by an amide linkage.

10. Silver halide emulsions containing as a color former fast to diffusion the condensation product of a compound containing a reactive methylene group and capable of reacting with the oxidation products of a primary aromatic amino developer to produce a dyestuff image with amidated polyvinyl methyl ketone.

11. Silver halide emulsions containing as a color former fast to diffusion the condensation product of a compound containing a reactive methylene group and capable of reacting with the oxidation products of a primary aromatic amino developer to produce a dyestuff image with the amidated polymer of chlorpropionic acetal of polyvinyl alcohol.

12. The process of producing color images which comprises exposing a silver halide emulsion containing as a color former fast to diffusion the condensation product of a compound capable of reacting with the oxidation products of a primary aromatic amino developer to produce a dyestuff image with a polymer containing secondary amino groups obtained by the amidation of a polymer selected from the class consisting of mixed polymers derived from monomers containing and monomers free from halogen, halogenated polyvinyl acetals and ketogroup containing vinyl polymerisates, said polymer containing amino groups being joined to said compound by a linkage selected from the class consisting of carbonamide, sulfonamide, azomethine and direct nuclear carbon to nitrogen linkages, and developing said exposed silver halide emulsion with a primary aromatic amino developer.

13. The process as defined in claim 12 wherein the developer is p-amino dimethylaniline.

14. The process of producing color images images which comprises exposing a silver halide emulsion containing as a color former fast to diffusion the condensation product of a compound capable of reacting with the oxidation products of a primary aromatic amino developer to produce a dyestuff image with the amidated mixed polymer from polyvinyl chloride and an unsaturated aliphatic dicarboxylic acid, said polymer being linked to said compound by an amide linkage, and developing said exposed silver halide emulsion with a primary aromatic amino developer.

15. The process as defined in claim 14 wherein said unsaturated aliphatic dicarboxylic acid is maleic acid.

16. The process of producing color images which comprises exposing a silver halide emulsion containing as a color former fast to diffusion the condensation product of hydroxy naphthoic acid and the amidated mixed polymer from polyvinyl chloride and maleic acid, said polymer being linked to said hydroxy naphthoic acid by an amide linkage, and developing said silver halide emulsion with a primary aromatic amino developer.

17. The process of producing color images which comprises exposing a silver halide emulsion containing as a color former fast to diffusion the condensation product of a compound containing a reactive methylene group and capable of reacting with the oxidation products of a primary aromatic amino developer to produce a dyestuff image with amidated polyvinyl methyl ketone and developing said exposed silver halide emulsion with a primary aromatic amino developer.

18. The process of producing color images which comprises exposing a silver halide emulsion containing as a color former fast to diffusion the condensation product of a compound containing a reactive methylene group and capable of reacting with the oxidation products of a primary aromatic amino developer to produce a dyestuff image with the amidated polymer of chlorpropionic acetal of polyvinyl alcohol and developing said exposed silver halide emulsion with a primary aromatic amino developer.

19. Silver halide emulsions containing as a color former fast to diffusion the condensation product of 1-phenyl-3-methyl-5-pyrazolone-3'-carboxylic acid chloride and amidated polyvinyl methyl ketone.

20. A silver halide emulsion containing as a color former fast to diffusion the condensation product of acetoacetyl amino phenyl carboxylic acid and amidated chloropropion acetal from polyvinyl alcohol.

ALFRED FRÖHLICH.
WILHELM SCHNEIDER.